Figure 1:
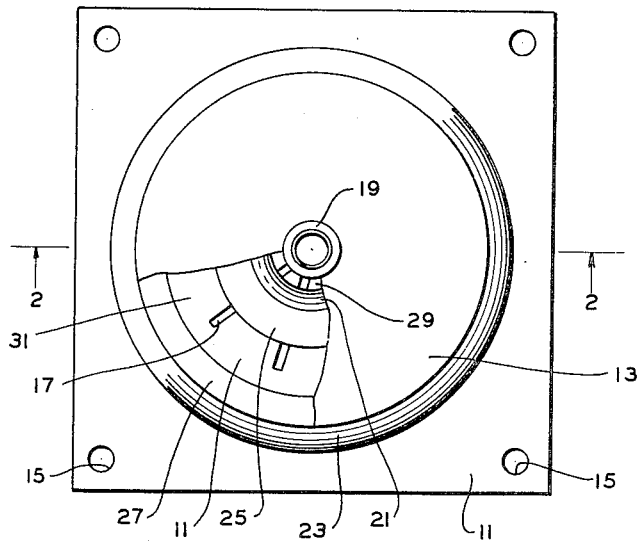

Dec. 26, 1950 N. E. LEE 2,535,080

MOUNTING

Filed June 7, 1945

INVENTOR.
NORMAN E. LEE
BY
William D. Hall
ATTORNEY

Patented Dec. 26, 1950

2,535,080

UNITED STATES PATENT OFFICE 2,535,080

MOUNTING

Norman E. Lee, Forest Hills, N. Y.

Application June 7, 1945, Serial No. 598,197

5 Claims. (Cl. 248—22)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to improvements in mountings and more particularly to improvements in mounting means of the type used to sustain a load relative to a base, so as to prevent or at least minimize the transmission of vibrations, shocks and noises from said load to said base and vice versa.

Vibration and shock mounts of the prior art, although used in tremendous quantities, have been found to be badly defective in performing their intended purposes.

Some mounts are capable of curtailing the transfer of vibrations of relatively high frequency, but are unsatisfactory because they allow vibrations at the resonant or natural frequency of the supported load to be so greatly amplified as to be seriously detrimental.

Some operate to attenuate deflections only in one direction of movement, such as vertical, and are therefore unsuited to installations requiring attenuation in several directions, as both vertical and horizontal.

Some are equipped with snubbers which come into play abruptly when the deflection goes beyond a certain amplitude and, as a result, they set up counterforces which are often more destructive to sensitive apparatus than the vibrations and shocks which the mounts are designed to absorb.

Some supports, having hydraulic systems comprising a cylinder and a piston operating therein, have excellent vibration damping characteristics but are relatively large in size and are expensive to manufacture and maintain, and they also are subject to leakage of the hydraulic medium therefrom. In addition, they are generally good in only one direction and they require a spring system separate from the hydraulic system.

In some mounts, oscillations persist and add to later oscillations so as to amplify rather than reduce them.

Some installations require mounts which will protect against a number of different kinds of impulses. For instance, in aircraft sensitive apparatus must be shielded from forced vibrations of the engines and associated parts, at various speeds including that at which there are generated vibrations of the resonant frequency of the mounted equipment, and also from sudden shocks occurring in rough air and when landing.

In marine installations, provision must be made not only against vibrations set up by the engines, shafts and propellers, which operate at variable speeds, usually of lower frequencies than in aircraft, but also against deflections caused by pitching and rolling of the vessel.

In vehicular installations the problem is more complicated as the supports must provide protection against forced vibrations of the engines and associated parts, operating at variable speeds, including the natural vibrating frequencies; vibrations due to substantially uniform, minor irregularities of the road beds traversed by the vehicles, which usually have abrupt wave-forms; and shocks due to holes and abnormal irregularities in the road surfaces. These conditions are greatly exaggerated in the case of military vehicles which often must cover terrain far rougher than other vehicles and which may also be subjected to ballistic impacts and concussions.

It is intended by the present invention to provide a shock and vibration support which is not attended by the foregoing defects of earlier mounts.

It is an object of the present invention to provide means of supporting equipment which will be soft and resilient enough to isolate high frequency vibrations, and which will also damp and absorb vibrations in the resonant frequency range as well as shocks of relatively large force and amplitude.

It is another object to provide a mount which incorporates both a shock absorbing system and a spring system in a single unit.

It is still another object to provide such supports wherein the operation of the absorbing system follows from the action of the spring system, and wherein the shock absorbing characteristics may be made to follow optimum values by changing the hydraulic action during operation.

It is a still further object to provide such mounts wherein natural rubber or a similar material may be used as the spring system and wherein deformations of said material are utilized to accelerate the functioning of the shock absorption system.

It is a further object to provide supporting means which will cushion displacements in different directions, such as in vertical, horizontal and rotational directions.

Another object is to employ hydraulic damping in mounting devices which are so designed that they will not suffer from leakage of the hydraulic medium, which will be small in size relative to earlier hydraulic mounts, which will incorporate no parts moving against each other with resultant wear, and changes in operating characteristics and replacement of parts.

It is still another object to provide mounts in which the hydraulic medium is confined in extensible chambers which provide the necessary volumetric capacity for the medium under different conditions of operation.

Still another object is to provide mounts, the external dimensions of which allow them to be substituted for presently manufactured mounts without necessitating changes in either the base or the load.

A still further object is to provide mounts designed to absorb and attenuate shocks to such a degree as to eliminate the need of snubbers and thereby avoid the countershocks frequently caused thereby.

It is still another object to provide mounts wherein metal to metal contacts are eliminated and hence the transfer of sound, as well as vibration and shock, is inhibited.

The foregoing objects, and others which will become clear from the following specification, are accomplished by a mount of the type illustrated in the drawings. The preferred embodiment illustrated in the drawings comprises two mutually parallel plates which are joined by two concentric tubular spring members of flexible material, such as natural or synthetic rubber. The inner member is bowed inwardly and the outer member outwardly and the ends of both members are secured to the aforesaid plates so as to form a central chamber within the inner member and a ring-shaped chamber within the outer member and surrounding the inner member. Said chambers are connected by one or more constricted orifices, so that a hydraulic medium, which may be gaseous or liquid or both, may flow between them.

The two plates aforesaid may be secured respectively to a base and a load, which are to be insulated from each other. The flexible tubular spring members make up a spring system intended to isolate high frequency vibrations, such as those resulting from the operation of internal combustion engines and the like. The two intercommunicating chambers and the hydraulic medium therein comprise a hydraulic system, which is intended to attenuate and absorb movements of greater force and amplitude, such as those resulting from the operation of engines in the resonant frequency range of the suspension and at lower frequencies and those which are due to severe road irregularities or ballistic shocks. The energy is then dissipated in forcing the hydraulic medium back and forth through the restricted orifices and in heat generated thereby.

Figure 2:
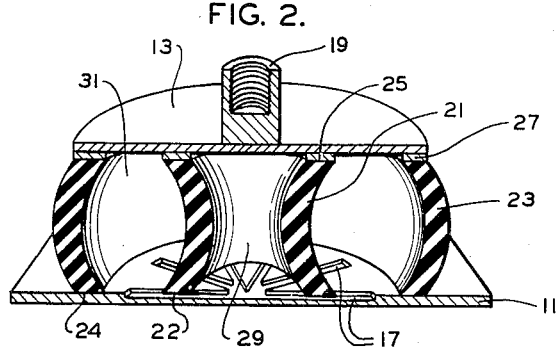
Figure 3:
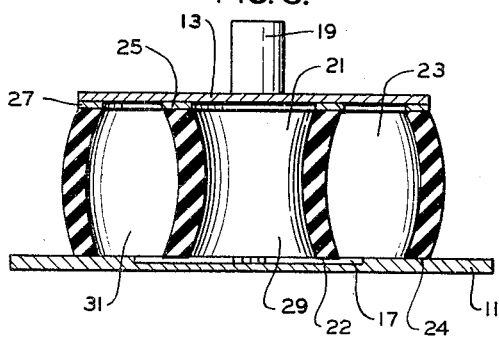
Figure 4:
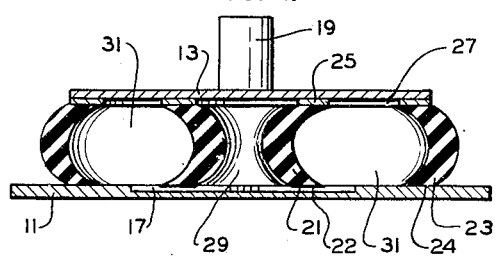

In the accompanying drawings (which, for clarity, do not show the base or load or the hydraulic medium), Figure 1 is a plan view of a preferred form of mounting embodying the present invention, shown in its normal, at rest, condition, a portion of the load plate being broken away to expose the interior;

Figure 2 is a perspective view of said mounting, vertically sectioned along the line 2—2 of Figure 1; and Figures 3 and 4 are vertical sections, along said line 2—2 of Figure 1, wherein the mounting is shown when the base plate is deflected respectively below and above its normal, at rest, position.

Referring to the drawings, the mounting illustrated includes a flat metal base plate 11 and a flat metal load plate 13, which are both horizontally disposed, the load plate 13 being spaced from and above the base plate 11. The base plate 11 may have any convenient peripheral configuration and is here shown as square. It is pierced by several fastening holes 15. The upper surface of the central portion of the base plate 11 is provided with one or more, radially disposed, short, shallow channels 17.

The load plate 13 is of circular configuration. Extending axially upwardly from the midpoint of said load plate 13, and rigidly secured thereto, as by welding or otherwise, is an internally threaded bushing 19, which is receivable to a fastening bolt (not shown).

Disposed between the plates 11, 13, are a pair of concentric spring members 21, 23 which are made up of a suitable flexible material, such as natural or synthetic rubber. Said spring members 21, 23 are generally tubular in shape, the inner spring member 21, however, being made up with its central circumferential portion bowed inwardly and the outer spring member 23 with its central circumferential portion bowed outwardly. The lower ends 22, 24 of both the said tubular members 21, 23, respectively, are secured, by any suitable means, as by a metal to rubber bond, directly to the base plate 11, the lower end 22 of the inner spring member 21 spanning the radial channels 17 and the lower end 24 being joined to the base plate 11 beyond the outer ends of said channels 17. A pair of concentrically disposed, flat, metal washers 25, 27 are secured respectively to the upper ends of the tubular members 21, 23, as by a suitable metal to rubber bond. Said washers 25, 27 are also securely fastened to the undersurface of the load plate 13, as by welding or other suitable means.

As will be seen, the arrangement of parts just described provides a central chamber 29 (which is positioned within the inner tubular spring member 21 and between the central portions of the base and load plates 11, 13) and a ring-shaped chamber 31 (which encircles said inner spring member 21 and is positioned within the outer spring member 23 and between said plates 11, 13). Said chambers 29, 31 may be filled with any suitable hydraulic medium (not shown) which may be a liquid, such as oil or glycerine, or a gas, such as air, or a combination of both, the particular medium and the viscosity thereof being determined by the intended use of the mounting. Said chambers 29, 31 intercommunicate through the channels 17.

In the operation of the mount just described, the base plate 11 may be secured by suitable fastening means (not shown), such as bolts, through the holes 15, to a base (not shown), and a load (not shown), which is to be vibrationally insulated from said base, may be secured to the load plate 13 by means of a bolt (not shown) screwed into the bushing 19. Assuming the installation to be of a radio set in a motor vehicle, the vehicle is the base and the radio set is the load. At rest, the mounting would then be as shown in Figures 1 and 2.

During operation of the motor vehicle, the base plate 11 is caused to oscillate. When the said base plate 11 is deflected downwardly (as in Figure 3) during such oscillation, the amount of bow of the tubular spring members 21, 23 is reduced, thereby increasing the volumetric capacity of the central chamber 29, and decreasing the volumetric capacity of the ring-shaped chamber 31, and resulting in a flow of the hydraulic medium, radially inwardly through the channels 17, from said ring-shaped chamber 31 to said central chamber 29. When the base plate 11 is deflected upwardly (Figure 4), the reverse is true, namely, the capacity of the central chamber 29 is reduced and that of the ring-shaped chamber 31 is increased, resulting in a flow of the medium in the opposite direction.

Any relative vertical movements between the base and load plates 11, 13 cause flexure of the tubular spring members 21, 23. If said members 21, 23 are sufficiently thin and of a rather flexible compound, the mounting will be soft, which is particularly advantageous for the attenuation of vibrations of high frequency. Despite this softness of the spring system, however, the mounting described will, nevertheless, be capable of absorbing and dissipating low frequency vibrations, and particularly those in the resonant frequency range of the suspended load, and shocks of considerable force and amplitude. The soft spring system described above would not be able alone to protect the load against such destructive energy whereas its combination with hydraulic damping does the job effectively.

The steady energy absorption by the hydraulic system, combined with the increasing recovery force stored up in the spring system, as the amplitude of deflection increases, results in a time lag in the deflection, thereby keeping the amplitude of deflection of the load within the predetermined limits of a particular mount. Thus, by a steadily increasing storage and absorption of energy, the vibrations and shocks are attenuated without the use of snubbers of any kind, which may act with an injurious abruptness.

It is also to be noted that vertical deflections of considerable amplitude, tending to move the base plate 11 up to the load plate 13 will result in a point being reached where the total volumetric capacity of the two chambers 29, 31 will tend to decrease. If an incompressible hydraulic medium is being used, excessive pressures will be relieved by the stretching of the outer tubular member 23. However, the increased pressures within the spring members 21, 23 will at the same time cause an increase of the hydraulic damping effect.

An important feature of the present invention is that axial deflections of small amplitude cause a relatively large change in the relative volumetric capacities of the two chambers 29, 31. This is accomplished by the fact that deformations of the resilient material of the spring members 21, 23 accelerate the increase of volumetric capacity of one of the chambers 29, 31 while accelerating the decrease of the capacity of the other. This acceleration of change in relative volumetric capacities is particularly advantageous where a hydraulic medium of low viscosity is used, as it results in a more rapid flow of the medium through the channels 17 and hence a greater absorption of energy. Low viscosity liquids are sometimes preferable because they may be more satisfactory over greater temperature ranges.

The damping characteristics of the mounting described herein may be made to follow optimum values by changing the hydraulic action during deflection by varying the sizes of the orifices through which the hydraulic medium must flow between the two chambers 29, 31. This may be done by designing the mount so that during greater deflections the lower end of the inner spring member 21, spanning the channels 17, will sag somewhat into said channels so as to restrict the orifices therethrough and thereby slow down the flow of the medium.

The mounting described also operates to absorb vibrations and shocks in a horizontal direction. Horizontal deflections of the base plate 11 will result in putting both the tubular members 21, 23 into shear. Here, as in vertical movements, the deflections are curtailed without the use of abruptly acting snubbers.

The preferred hydraulic medium of the embodiment described is a suitable fluid, such as oil. However, it may sometimes be advisable to use a hydraulic fluid combined with a small amount of air or other gas. This would be helpful during extreme upward deflections of the base plate 11 where the combined volumetric capacities of the two chambers 29, 31 would begin to decrease. The air, being compressible, will relieve excessive pressures. The air will also help compensate for pressure changes due to temperature variations.

The sizes and number of the grooves 17 will of course be determined by the viscosity and type of hydraulic medium being used.

The spring members 21, 23 may be secured directly to the load plate 13 if a suitable means for accomplishing this is worked out. However, in the present embodiment, manufacturing procedures dictated that said spring members 21, 23 be bonded to the washers 25, 27, which in turn were secured to the load plate 13.

Although the embodiment shown in the drawings has a particular geometry, it will be understood that various changes in geometry may be made within the spirit of the invention. Such changes in geometry and relative sizes of elements, and other modifications, may be made to suit the present mounting to different compounds of natural and synthetic rubber, to different hydraulic mediums and for different loading values.

Although not shown in the illustrated embodiment, it would be advisable to incorporate a means for injecting the hydraulic medium into the chambers 29, 31 after the mounting is assembled.

It will be understood that the mount described will also operate with the base plate secured to a load and the load plate secured to a base.

While there has been described what at present is considered a preferred embodiment of the present invention, it will be obvious to those skilled in the art that various changes and modifications may be made therein without departing from the invention and it is, therefore, aimed in the appended claims to cover such changes and modifications as fall within the true spirit and scope of the invention.

What is claimed is:

1. A mounting comprising a base plate; a load plate substantially parallel thereto; a pair of inner and outer concentric tubular spring members, disposed intermediate said plates and substantially normal thereto, the said spring members being of springy flexible material, and the opposite ends thereof being secured respectively to the base and load plates; said inner and outer spring members respectively being bowed inwardly and outwardly at their central portions; so as to form two enclosed hydraulic chambers, one chamber being within the inner spring member and the other chamber being outside the inner spring member and within the outer spring member; a restricted orifice connecting said chambers; a hydraulic medium within said chambers; so that upon movements of the plates, relative to each other and substantially longitudinal of the spring members, the spring members will be subjected to flexure and the hydraulic medium will be caused to flow between the chambers aforesaid through the orifice aforesaid.

2. A mounting to sustain a load relative to a base, comprising a base plate; an inner tubular spring member, of springy flexible material, bowed inwardly at its central portion, its axis being substantially normal to the base plate and one end thereof being secured to the base plate; an outer tubular spring member, of springy flexible material, bowed outwardly at its central portion, disposed concentrically with and encircling the inner spring member aforesaid, and one end being secured to the base plate; a load plate substantially parallel to the base plate and secured to the other ends of the inner and outer spring members; so as to form two enclosed hydraulic chambers, one within the inner spring member and between the two plates aforesaid and the other outside the inner spring member and within the outer spring member and between the two plates aforesaid; a hydraulic medium within said chambers; a restricted orifice interconnecting the said two chambers; means to fasten said base plate to a base and means to fasten said load plate to a load; so that upon movements of one of said plates toward the other and substantially longitudinal of the spring members, said spring members will be subjected to flexure, and hydraulic medium will be caused to flow through the orifice from the inner chamber to the outer chamber.

3. A mounting comprising a base plate; a load plate substantially parallel thereto; a pair of inner and outer concentric tubular spring members, disposed intermediate said plates, the said spring members being of springy flexible material, and the opposite ends thereof being secured respectively to the base and load plates; said inner and outer spring members respectively being bowed inwardly and outwardly at their central portions; so as to form two enclosed hydraulic chambers, one chamber being within the inner spring member and the other chamber being outside the inner spring member and within the outer spring member; a restricted orifice connecting said chambers; a hydraulic medium within said chambers; so that upon movements of the plates, relative to each other and substantially longitudinal of the spring members, the spring members will be subjected to flexure and the hydraulic medium will be caused to flow between the chambers aforesaid through the orifice aforesaid.

4. A mounting comprising a base plate; a load plate substantially parallel thereto; a pair of inner and outer concentric tubular spring members, disposed intermediate said plates, the said spring members being of springy flexible material, and the opposite ends thereof being secured respectively to the base and load plates; said inner and outer spring members respectively being bowed inwardly and outwardly at their central portions; so as to form two enclosed hydraulic chambers, one chamber being within the inner spring member and the other chamber being outside the inner spring member and within the outer spring member; a restricted orifice from each of said chambers; a hydraulic medium within each of said chambers, so that upon movements of the plates, relative to each other and substantially longitudinal of the spring members, the spring members will be subjected to flexure and the hydraulic medium will be caused to flow through the said orifices.

5. A mounting to sustain a load relative to a base, comprising a base plate; an inner tubular spring member, of springy flexible material, bowed inwardly at its central portion, its axis being substantially normal to the base plate and one end thereof being secured to the base plate; an outer tubular spring member, of springy flexible material, bowed outwardly at its central portion, disposed concentrically with and encircling the inner spring member aforesaid, and one end being secured to the base plate; a load plate substantially parallel to the base plate and secured to the other ends of the inner and outer spring members; so as to form two enclosed hydraulic chambers, one within the inner spring member and between the two plates aforesaid and the other outside the inner spring member and within the outer spring member and between the two plates aforesaid; a hydraulic medium within each of said chambers; a restricted orifice from each of said chambers; means to fasten said base plate to a base and means to fasten said load plate to a load; so that upon movements of one of said plates toward the other and substantially longitudinal of the spring members, said spring members will be subjected to flexure, and hydraulic medium will be caused to flow through the said orifices.

NORMAN E. LEE.

REFERENCES CITED

The following references are of record in the file of this patent:

UNITED STATES PATENTS

| Number | Name | Date |
|---|---|---|
| 5,696 | Ray | Aug. 1, 1848 |
| 1,003,579 | Bancroft | Sept. 19, 1911 |
| 2,384,248 | Marzetti | Oct. 9, 1945 |

FOREIGN PATENTS

| Number | Country | Date |
|---|---|---|
| 303,004 | Great Britain | Aug. 29, 1929 |